United States Patent
Saddawi et al.

(10) Patent No.: US 11,015,469 B2
(45) Date of Patent: May 25, 2021

(54) COOLANT AIRFLOW ASSEMBLY PARTICULATE FILTER WITH PANELS IN SERIES

(71) Applicant: ROLLS-ROYCE plc, London (GB)

(72) Inventors: Salwan D. Saddawi, Derby (GB); Adrian L. Harding, Derby (GB)

(73) Assignee: ROLLS-ROYCE PLC, London (GB)

( * ) Notice: Subject to any disclaimer, the term of this patent is extended or adjusted under 35 U.S.C. 154(b) by 108 days.

(21) Appl. No.: 16/284,107

(22) Filed: Feb. 25, 2019

(65) Prior Publication Data

US 2019/0292925 A1    Sep. 26, 2019

(30) Foreign Application Priority Data

Mar. 21, 2018 (GB) ..................... 1804484

(51) Int. Cl.

| | |
|---|---|
| *F02C 7/055* | (2006.01) |
| *F01D 9/06* | (2006.01) |
| *F01D 25/12* | (2006.01) |
| *F01D 5/18* | (2006.01) |
| *F01D 25/14* | (2006.01) |

(52) U.S. Cl.
CPC .............. *F01D 9/065* (2013.01); *F01D 5/18* (2013.01); *F01D 25/12* (2013.01); *F01D 25/14* (2013.01); *F05D 2220/32* (2013.01); *F05D 2240/12* (2013.01); *F05D 2240/30* (2013.01); *F05D 2260/205* (2013.01)

(58) Field of Classification Search
CPC .. F02C 7/055; F02C 7/052; F02C 7/05; F01D 9/065; F01D 25/12; F01D 5/18; F01D 5/187; B64C 23/00

USPC ....................................................... 415/121.2
See application file for complete search history.

(56) References Cited

U.S. PATENT DOCUMENTS

| | | | |
|---|---|---|---|
| 4,820,122 A | | 4/1989 | Hall et al. |
| 4,820,123 A | * | 4/1989 | Hall ........................ F01D 5/081 416/92 |

(Continued)

FOREIGN PATENT DOCUMENTS

EP    1760260    3/2007

OTHER PUBLICATIONS

Great Britain search report dated Sep. 19, 2018, issued in GB Patent Application No. 1804484.2.

*Primary Examiner* — Eldon T Brockman
*Assistant Examiner* — Michael L Sehn
(74) *Attorney, Agent, or Firm* — Brinks Gilson & Lione (57) ABSTRACT

The present disclosure concerns removal of entrained contaminant particles in a coolant airflow for a gas turbine engine. Example embodiments include a coolant airflow assembly for a gas turbine engine, comprising: a coolant feed passage connected between a supply of coolant air and an inlet of a component to be cooled, the coolant feed passage defining a coolant airflow path and comprising first and second opposing internal faces (305, 306), the inlet of the component connected to the coolant airflow path through one of the first and second internal faces (305, 306) of the coolant feed passage; and a particulate filter for removing entrained particles from the coolant airflow path, comprising: a first filter panel extending from the first face into the coolant airflow path upstream of the inlet of the component; and a second filter panel extending from the second face into the coolant airflow path upstream of the first filter panel.

20 Claims, 4 Drawing Sheets

(56) References Cited

U.S. PATENT DOCUMENTS

| | | | | |
|---|---|---|---|---|
| 6,250,068 B1* | 6/2001 | Tajima | ................... | F01D 25/02 |
| | | | | 60/803 |
| 8,167,980 B2* | 5/2012 | Hiner | ................. | B01D 46/0068 |
| | | | | 95/268 |
| 8,943,791 B2* | 2/2015 | Tibbott | ................... | F02C 7/18 |
| | | | | 60/39.091 |
| 8,961,111 B2* | 2/2015 | Benson | .................. | F01D 5/187 |
| | | | | 415/121.2 |
| 2011/0067387 A1 | 3/2011 | Jacques et al. | | |
| 2012/0014810 A1 | 1/2012 | Antunes et al. | | |
| 2016/0075439 A1* | 3/2016 | Mores | ................... | F02C 7/055 |
| | | | | 244/53 B |
| 2017/0284226 A1* | 10/2017 | Nasir | ....................... | F02C 7/36 |

* cited by examiner

COOLANT AIRFLOW ASSEMBLY PARTICULATE FILTER WITH PANELS IN SERIES

CROSS-REFERENCE TO RELATED APPLICATIONS

This application is based upon and claims the benefit of priority from British Patent Application No. GB 1804484.2, filed on 21 Mar. 2018, the entire contents of which are incorporated by reference.

BACKGROUND

Technical Field

The present disclosure concerns removal of entrained contaminant particles in a coolant airflow for a gas turbine engine.

Description of Related Art

When supplying coolant air flow to high temperature components of a gas turbine engine, it is important that any entrained material in the air flow is either not harmful to the components to be cooled or is removed before coming into contact with the components. Contaminants that can be a problem with coolant air flow include dust and sand, which may be particular problems for aircraft gas turbine engines operating in environments where such contaminants may be airborne.

Depending on the amount and type of contaminants in the coolant airflow, such contaminants can have one or more effects on turbine components cooled by airflows. A first issue can result from entrained particles blocking narrow cooling passages, such as those provided in high temperature turbine blades and guide vanes to maintain the material below its melting point. Any blocked passages will lead to a local increase in temperature, which can result in local oxidation and cracking of the material. With multiple blockages, separate cracks may merge, potentially leading to loss of material or even catastrophic failure of the component, which can cause damage to other components in the engine and failure of the engine.

A second issue is that contaminants in the coolant airflow can, if taken into account during the design phase, reduce the ability to achieve a cost-effective cooling design. To achieve a desirable pressure drop and heat transfer across a component, smaller, more narrowly spaced holes tend to be required. If, however, passage of particles of a certain size must be guaranteed, the holes will need to be larger and more widely spaced, resulting in poorer cooling efficiency.

A third issue is that convective cooling heat transfer will be reduced when internal cooling surfaces are covered with a low thermal conductivity contaminant such as sand, which will have a direct impact on the life of a component. The lower thermal conductivity leads to a reduction in convective cooling, with the contaminant layer thereby effectively acting as a thermal barrier by reducing heat transfer from the metal to the coolant airflow.

US 2011/0067387 A1 discloses a separator device for separating dirt particles from a flow of cooling air fed to aerofoils of the turbine section of a gas turbine engine, the separator extending across a conduit which bypasses the combustor of the engine to convey pressurised cooling air carrying dirt particles from the compressor section of the engine to openings which direct the air into the aerofoils. The separator device is configured to direct a first portion of the impinging cooling air flow away from the openings and to allow a second portion of the impinging cooling air to continue to the openings. The first portion of cooling air has a higher concentration of the coarsest dirt particles carried by the cooling air than the second portion of cooling air. The separator device is effective at preventing dirt particles from entering the cooling air stream for cooling the aerofoils, but results in a significant pressure drop.

SUMMARY

According to a first aspect there is provided a coolant airflow assembly for a gas turbine engine, comprising:
 a coolant feed passage connected between a supply of coolant air and an inlet of a component to be cooled, the coolant feed passage defining a coolant airflow path and comprising first and second opposing internal faces, the inlet of the component connected to the coolant airflow path through one of the first and second internal faces of the coolant feed passage; and
 a particulate filter for removing entrained particles from the coolant airflow path, comprising:
  a first filter panel extending from the first face into the coolant airflow path upstream of the inlet of the component; and
  a second filter panel extending from the second face into the coolant airflow path upstream of the first filter panel.

An advantage of the coolant airflow assembly is that the component to be cooled is protected from low quality cooling air (i.e. air in which particulate material is entrained) by trapping and diverting particulate material without causing an undue pressure drop across the coolant feed passage.

The coolant airflow assembly may further comprise an airflow deflector extending from the first face into the coolant airflow path upstream of the second filter panel. The airflow deflector serves to alter the aerodynamics of the coolant airflow such that particulate material is more likely to be trapped by the second filter panel.

The first filter panel may comprise a first portion extending from the first face of the coolant feed passage into the coolant airflow path and a second portion extending from an end of the first portion in the coolant airflow into the coolant airflow path in a downstream direction.

The first filter panel may comprise a curved first portion having an inner concave surface facing upstream.

The first filter panel may comprise a plurality of passages through the panel, the passages being sized to capture particles entrained in the airflow path. The passages through the pane may be sized to capture particles greater than half of a minimum film cooling hole diameter in the component to be cooled.

The second filter panel may comprise a first portion extending from the second face of the coolant feed passage into the coolant airflow path and a second portion extending from an end of the first portion in the coolant airflow into the coolant airflow path in an upstream direction.

The second filter panel may comprise a plurality of passages through the panel, the passages being sized to capture particles entrained in the airflow path. The passages through the panel may be sized to capture particles greater than half of a minimum film cooling hole diameter in the component to be cooled.

The coolant airflow path between the first filter panel and the second face, between the second airflow panel and the first face, and between the first filter panel and the second filter panel may each have a minimum cross sectional area no smaller than a cross-sectional area of the inlet of the component to be cooled.

The passages through either or both of the first and second filter panel may have a diameter of between 0.1 and 1 mm, between 0.1 and 0.5 mm or between 0.2 and 0.4 mm.

The coolant airflow assembly may comprise a bypass passage in the first face of the coolant feed passage upstream of the first filter panel.

The first and second filter panels may be integrated into a common panel having an airflow passage between the first and second panels defined by one or more holes in the common panel.

The component to be cooled may be one or more nozzle guide vanes, or alternatively one or more turbine blades. In the high and intermediate pressure turbines of a typical gas turbine engine all vanes and blades will require cooling, and may therefore all benefit from a coolant airflow assembly having filter panels as described herein.

According to a second aspect there is provided a gas turbine engine comprising a coolant airflow assembly according to the first aspect.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
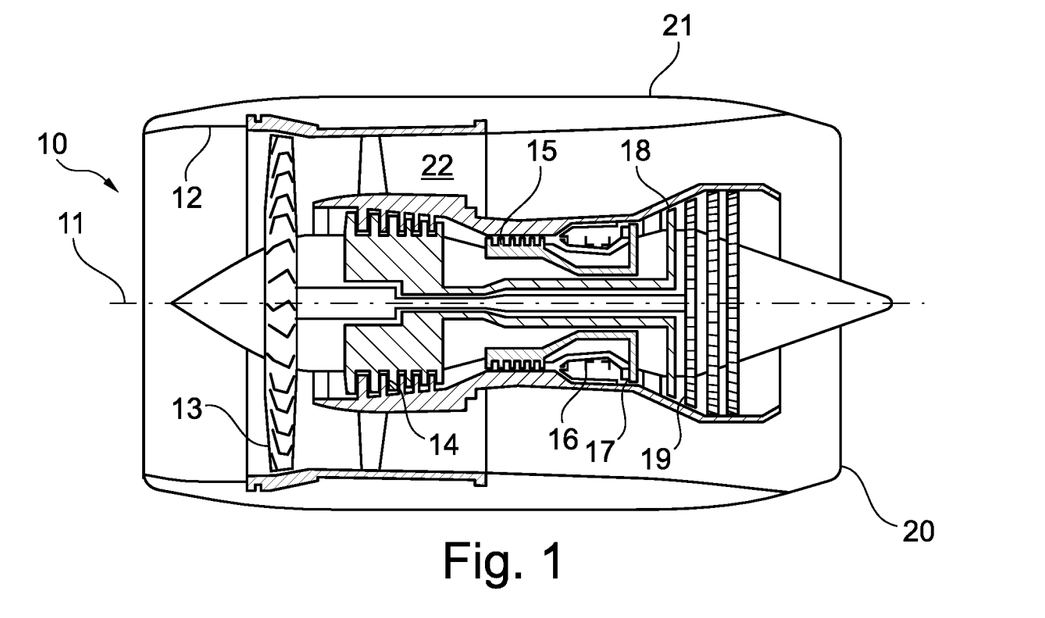
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
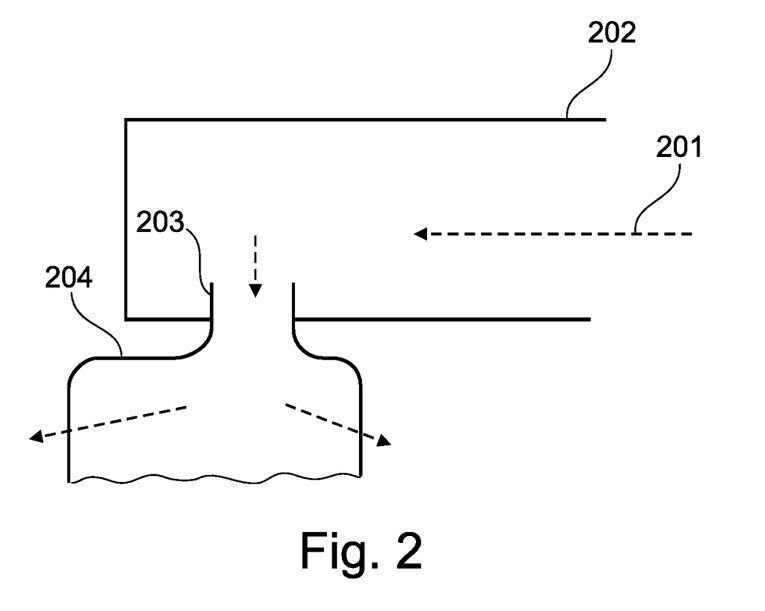
FIG. 2 is schematic diagram of an example conventional coolant airflow arrangement for a nozzle guide vane.

In a typical gas turbine engine, coolant air is drawn from outside the engine and into components that operate at high temperatures, such as a high pressure turbine (HPT) nozzle guide vane, as illustrated schematically in FIG. 2. The supplied air 201 is fed into a coolant feed passage 202 towards an inlet 203 of the nozzle guide vane 204. The coolant air then flows through the nozzle guide vane and through coolant passages out into the exhaust gas stream. The same principle applies for cooling turbine blades in the gas turbine engine.

Figure 3:
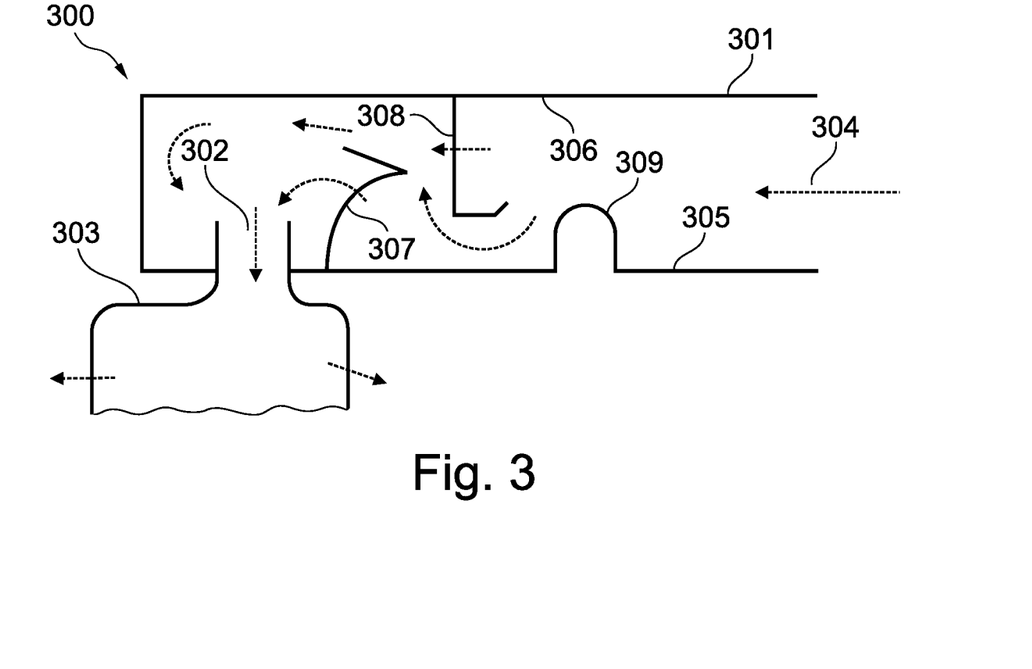
FIG. 3 is schematic diagram of an example coolant airflow assembly.

FIG. 3 illustrates an example coolant airflow assembly 300 for a gas turbine engine, in which a particulate filter is provided for removing entrained particles from a coolant airflow path. The assembly 300 comprises a coolant feed passage 301 connected between a supply of coolant air and an inlet 302 of a component to be cooled, which in this case is an inlet 302 of a nozzle guide vane 303. In other examples, the component to be cooled may be a turbine blade. The coolant feed passage 301 defines a coolant airflow path extending between the coolant air supply end 304 and the inlet 302 of the component 303, and comprises first and second opposing internal faces 305, 306. The inlet of the component 303 is connected to the coolant airflow path through, in this case, the first face 305 of the coolant feed passage 301.

The particulate filter comprises a first filter panel 307 that extends from the first face 305 into the coolant airflow path upstream of the inlet 302 and a second filter panel 308 that extends from the second face 306 into the coolant airflow path upstream of the first filter panel 307. Each filter panel 307, 308 is designed to serve two purposes. The first purpose is to prevent passage of particulates above a certain size from passing through the panel, which is achieved by each panel having airflow passages through a thickness of the panel that are sized to capture particulates. The second purpose is to deflect airflow, causing turbulence that increases the effectiveness of the filtering capacity of each panel and creates volumes of low-speed air that allow larger particulates to be collected at certain regions of the panel, as described in further detail below.

The filter panels 307, 308 do not extend across the full width of the coolant feed passage 301, allowing coolant airflow to pass around the panels 307, 308 and into the inlet 302 without having to pass through the panels 307, 308. This prevents the particulate filter from becoming blocked and restricting coolant supply to the component 303. This configuration also reduces the pressure drop along the coolant feed passage 301 between the air supply end 304 and the component inlet 302.

The airflow passages in each panel 307, 308 are sized such that smaller particles are allowed to pass through. The size of the largest particle allowed to pass through the panels 307, 308 may be determined by the smallest film cooling hole in the component 303. If, for example, the smallest film cooling hole is 0.6 mm then the airflow passages within the filter should be designed to be around 0.3 mm or smaller. In a general aspect therefore, the airflow passages through each of the filter panels may be designed to be no larger than 50% of the diameter of the smallest airflow passage through the component to be cooled.

During operation, cooling air travels through the coolant feed passage 301 towards the component 303 to be cooled, as shown in FIG. 3. An additional aerodynamic feature in the form of an airflow deflector 309, extending from the first face 305 into the coolant airflow path upstream of the second filter panel 308, may be provided to deflect or change the airflow path towards the second filter panel 308. Particles entrained in the airflow that are smaller than airflow passages in the second filter panel 308 may pass through the panel 308, while larger particles are trapped. Air flows through and around the second filter panel 308 and passes to the first filter panel 307, which provides a further obstacle for the airflow to pass either through or around. The airflow then passes to the inlet 302 and into the component 303 to be cooled.

Figure 4:
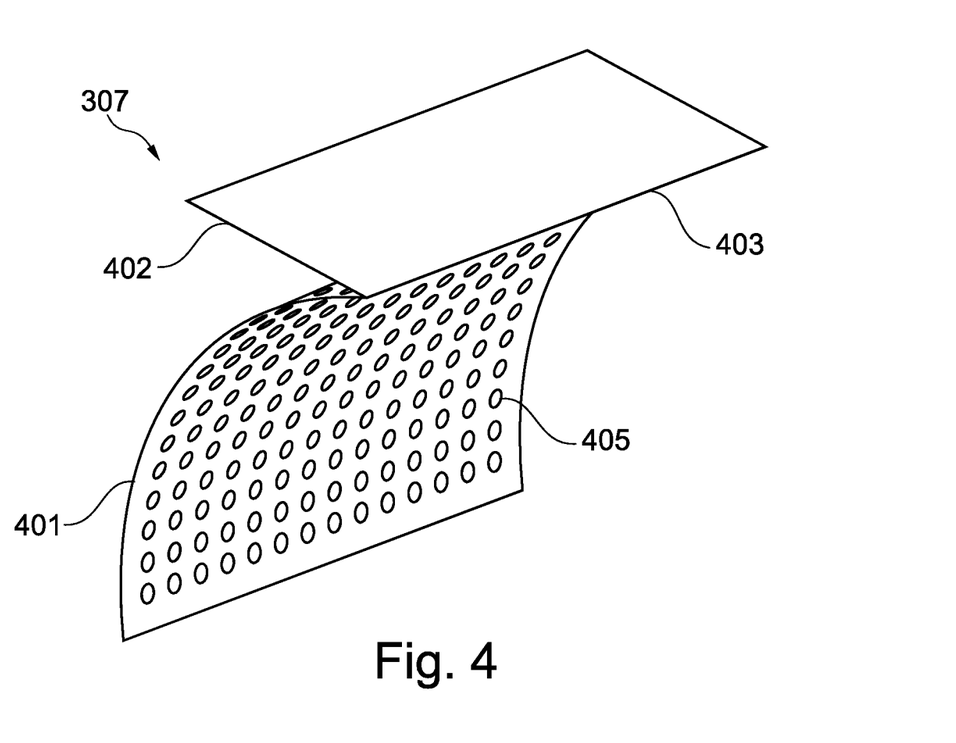
FIG. 4 is a schematic drawing of an example first filter panel.
Figure 5:
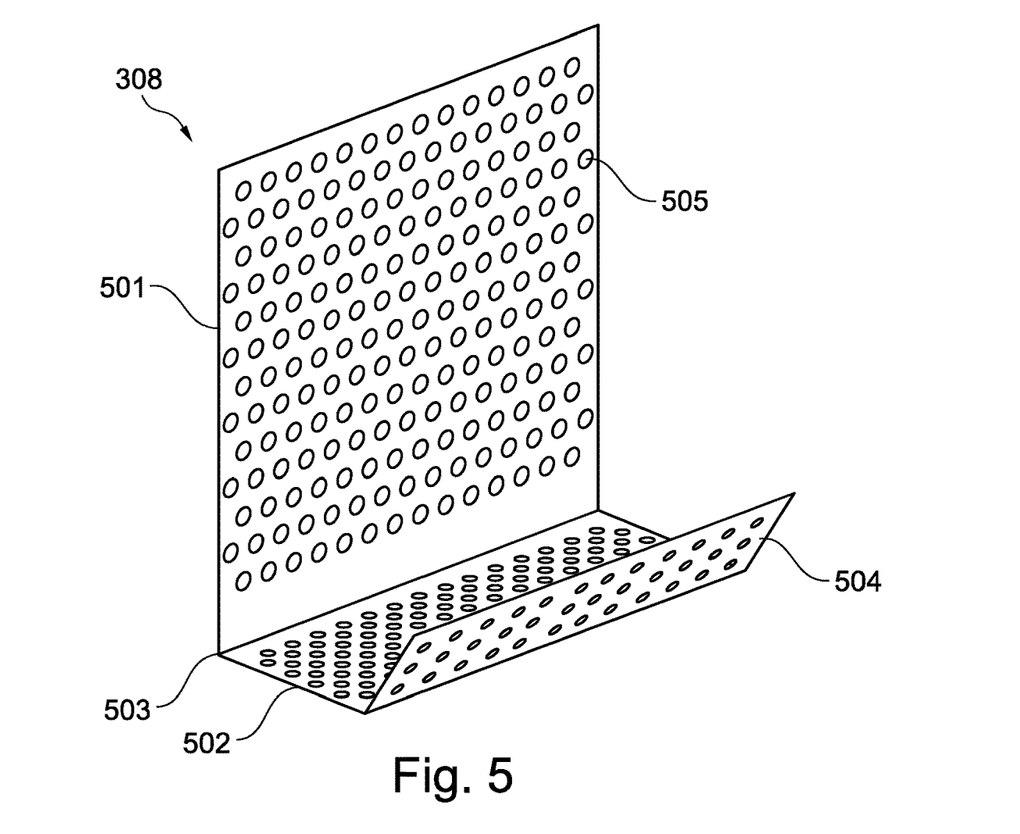
FIG. 5 is a schematic drawing of an example second filter panel.

FIGS. 4 and 5 show three dimensional views of the first and second filter panels 307, 308, respectively. The first filter panel 307, as shown in FIGS. 3 and 4, comprises a first portion 401 that extends from the first face 305 into the coolant feed passage 301 into the coolant airflow path. A second portion 402 of the first filter panel 307 extends from an end 403 of the first portion 401 in the coolant airflow into the coolant airflow path in a downstream direction.

The second filter panel 308 comprises a first portion 501 that, when in position in the coolant feed passage, extends from the second face 306 into the coolant airflow path, and a second portion 502 that extends from an end 503 of the first portion 501 in the coolant airflow into the coolant airflow path in an upstream direction. The second filter panel 308 may further comprise a third portion 504 extending from an end of the second portion 502 and directed towards the second face 306 of the coolant feed passage 301.

The first filter panel 307, which may catch particles that have not been caught by the second filter panel 308, is designed with an additional second portion 402 extending downstream from the end 403 of the first portion 401 so as to extend the flow path for air before the flow path enters the inlet 302 of the component 303 to be cooled. Particles may as a result become trapped between the inlet 302 and the first face 305 of the cooling passage 301.

In both the first and second filter panels 307, 308, at least the first portion comprises airflow passages that allow air to pass through the thickness of the panel. The airflow passages 405, 505 are shown exaggerated in size in FIGS. 4 and 5. In practical examples, the airflow passages may be provided by a perforated metal sheet or mesh panel forming at least part of the filter panel. The size of airflow passages provided in the panel may range between 0.1 and 1 mm, 0.1 and 0.5 mm, or 0.2 and 0.4 mm depending on the size of cooling passages in the component to be cooled. The size of passages in the first panel 307 may differ from the size of passages in the second panel 308. For example, the passages in the second panel 308 may be larger than the passages in the first panel 307. Each filter panel may comprise more than one filter, for example by having a range of airflow passage sizes provided by multiple filters providing a progressively narrowing filtering effect.

Figure 6:
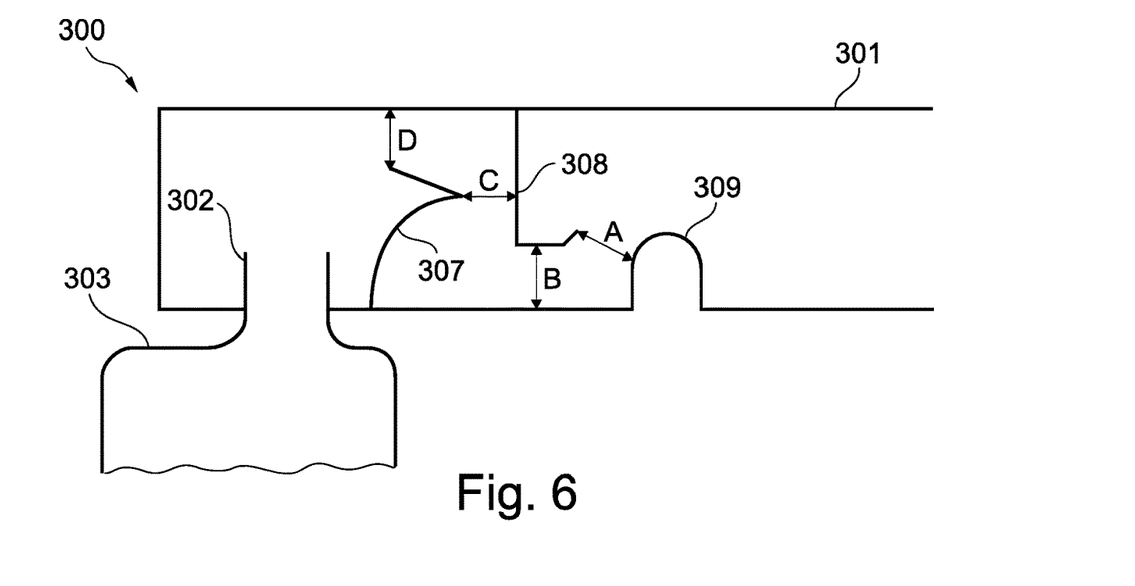
FIG. 6 is a schematic diagram of the example coolant airflow assembly of FIG. 3, indicating unrestricted airflow areas.

FIG. 6 illustrates a further view of the coolant airflow assembly of FIG. 3, in which unrestricted airflow areas between the filter panels 307, 308 and the surrounding components are indicated. The narrowest regions between the first and second panels 307, 308 (region C), between the first panel 307 and the second face of the passage 301 (region D), between the second panel 308 and the first face 305 of the passage 301 (region B), and between the second panel 308 and the airflow deflector 309, if present (region A), are all preferably designed to provide larger openings for the passage of air than the inlet 302 of the component 303 to be cooled. If the coolant airflow passage 301 directs airflow to more than one component to be cooled, the narrowest regions are preferably larger than a combined opening of the inlets for the components to be cooled. The cooling air as a result will not be restricted in the event the filters become blocked, leading to a reduction in cooling air directed to the component to be cooled, as well as reducing the pressure drop across the two filter panels.

Figure 7:
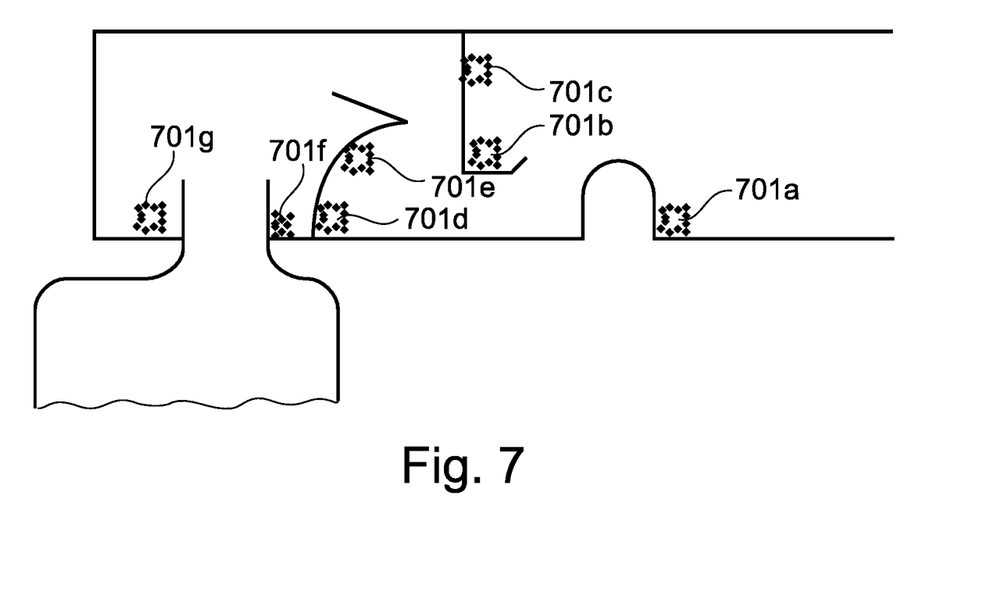
FIG. 7 is a schematic diagram of the example coolant airflow assembly of FIG. 3, indicating locations where particulates may accumulate.

FIG. 7 is a schematic diagram of the coolant airflow assembly of FIG. 3, further showing possible locations 701a-g where particulates, such as sand and other debris, may accumulate due to the design of the first and second panels 307, 308 and the airflow deflector 309. As well as trapping particles on the filter panel faces, at locations 701b-e, other locations 701a, 701f, 701g where airflow may be stationary or minimal may also accumulate particles.

Figure 8:
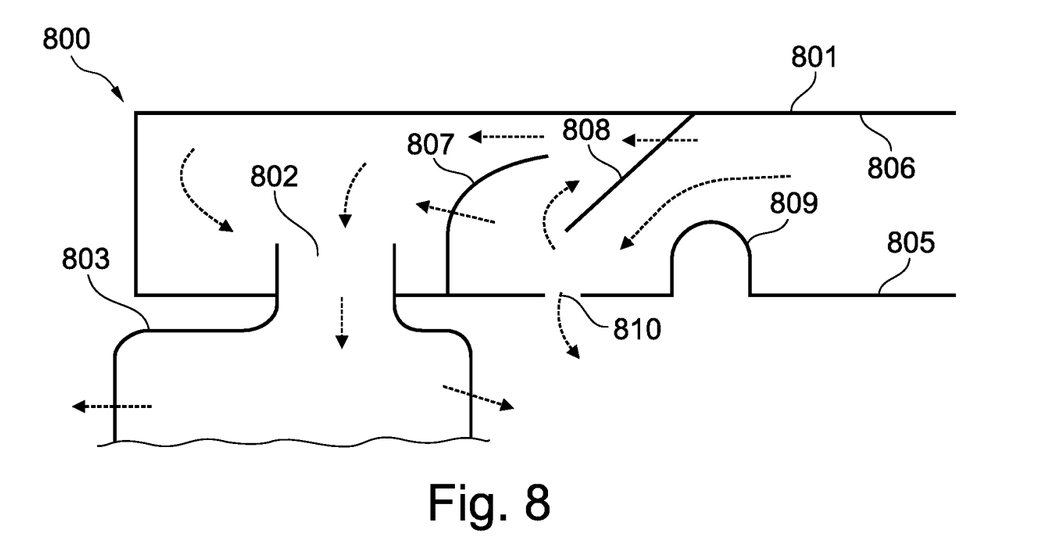
FIG. 8 is a schematic diagram of an alternative example coolant airflow assembly.

FIG. 8 illustrates an alternative example of a coolant airflow assembly 800, in which the first and second filter panels 807, 808 have a different arrangement to those in FIG. 3. The first panel 807 is curved back in the upstream direction as in FIG. 3, but without a second portion extending downstream. The second filter panel 808 extends in a direction downstream as it extends into the airflow passage within the coolant feed passage 801, making an angle to the second face 806 of around 45 degrees (for example. within a range of between 30 and 60 degrees). Together with the airflow deflector 809, this arrangement allows the first and second panels 807, 808 to be integrated into a single unit, with the airflow passage between the first and second panels defined by one or more larger holes in a panel comprising both the first and second panels 807, 808. Otherwise the functionality and arrangement of the panels is similar to that shown in FIG. 3 and described above.

Also shown in FIG. 8 is a bypass passage 810 in the first face 805 of the coolant feed passage 801, which allows a portion of the airflow through the passage 801 to exit before reaching the inlet 802 of the component 803 to be cooled. The arrangement of the bypass passage 801, being located between the airflow deflector 809 and the first filter panel 807, allows some particulates and other debris to be ejected from the coolant feed passage 801 and into the hot gas stream passing around the component 803. This feature also allows for some further cooling of the component 803.

The invention claimed is:

1. A coolant airflow assembly for a gas turbine engine, comprising:
   a coolant feed passage connected between a supply of coolant air and an inlet of a component to be cooled, the coolant feed passage defining a coolant airflow path and comprising first and second opposing internal faces, the inlet of the component connected to the coolant airflow path through one of the first and second internal faces of the coolant feed passage; and a particulate filter for removing entrained particles from the coolant airflow path, comprising:

a first filter panel extending from the first face into the coolant airflow path upstream of the inlet of the component; and a second filter panel extending from the second face into the coolant airflow path upstream of the first filter panel, wherein the coolant airflow path between the first filter panel and the second face, between the second airflow panel and the first face, and between the first filter panel and the second filter panel each has a minimum cross-sectional area no smaller than a cross-sectional area of the inlet of the component to be cooled.

2. The coolant airflow assembly of claim 1, comprising an airflow deflector extending from the first face into the coolant airflow path upstream of the second filter panel.

3. The coolant airflow assembly of claim 1, wherein the first filter panel comprises a first portion extending from the first face of the coolant feed passage into the coolant airflow path and a second portion extending from an end of the first portion in the coolant airflow path in a downstream direction.

4. The coolant airflow assembly of claim 3, wherein the first portion is curved and has an upstream-facing inner concave surface.

5. The coolant airflow assembly of claim 3, wherein the supply of cooling air comprises particles and the first filter panel comprises a plurality of passages through the panel, the passages being sized to capture particles entrained in the coolant airflow path.

6. The coolant airflow assembly of claim 5, the component having film cooling holes having a diameter, wherein the passages are sized to capture particles greater than half of a minimum film cooling hole diameter in the component to be cooled.

7. The coolant airflow assembly of claim 6, wherein the passages have a diameter of between 0.1 and 1 mm.

8. The coolant airflow assembly of claim 1, wherein the first filter panel comprises a curved first portion having an upstream-facing inner concave surface.

9. The coolant airflow assembly of claim 1, wherein the second filter panel comprises a first portion extending from the second face of the coolant feed passage into the coolant airflow path and a second portion extending from an end of the first portion into the coolant airflow path in an upstream direction.

10. The coolant airflow assembly of claim 9, wherein the second filter panel comprises a plurality of passages through the panel, the passages being sized to capture particles entrained in the airflow path.

11. The coolant airflow assembly of claim 9, the component having film cooling holes having a diameter, wherein the passages are sized to capture particles greater than half of a minimum film cooling hole diameter in the component to be cooled.

12. The coolant airflow assembly of claim 1, comprising a bypass passage in the first face of the coolant feed passage upstream of the first filter panel.

13. The coolant airflow assembly of claim 1, wherein the first and second filter panels are integrated into a common panel having an airflow passage between the first and second panels defined in series by an inlet through one hole in the common panel and an outlet through a further hole in the common panel.

14. The coolant airflow assembly of claim 1, wherein the component to be cooled is one or more nozzle guide vanes or one or more turbine blades.

15. A gas turbine engine comprising a coolant airflow assembly, comprising:

a coolant feed passage connected between a supply of coolant air and an inlet of a component to be cooled, the coolant feed passage defining a coolant airflow path and comprising first and second opposing internal faces, the inlet of the component connected to the coolant airflow path through one of the first and second internal faces of the coolant feed passage; and a particulate filter for removing entrained particles from the coolant airflow path, comprising:

a first filter panel extending from the first face into the coolant airflow path upstream of the inlet of the component; and a second filter panel extending from the second face into the coolant airflow path upstream of the first filter panel, wherein the first and second filter panels do not extend across a full width of the coolant feed passage, and wherein the first and second filter panels do not contact each other, the first and second filter panels including unrestricted airflow regions therebetween.

16. The gas turbine engine of claim 15, wherein the first and second filter panels comprise a plurality of passages through the respective panels, the passages being sized to capture particles entrained in the airflow path.

17. The gas turbine engine of claim 16, wherein the passages have a diameter of between 0.1 and 1 mm.

18. The gas turbine engine of claim 17, comprising a bypass passage in the first face of the coolant feed passage upstream of the first filter panel.

19. The gas turbine engine of claim 15, wherein the coolant airflow path between the first filter panel and the second face, between the second airflow panel and the first face, and between the first filter panel and the second filter panel each has a minimum cross sectional area no smaller than a cross-sectional area of the inlet of the component to be cooled.

20. A coolant airflow assembly for a gas turbine engine, comprising:

a coolant feed passage connected between a supply of coolant air and an inlet of a component to be cooled, the coolant feed passage defining a coolant airflow path and comprising first and second opposing internal faces, the inlet of the component connected to the coolant airflow path through one of the first and second internal faces of the coolant feed passage; and a particulate filter for removing entrained particles from the coolant airflow path, comprising:

a first filter panel extending from the first face into the coolant airflow path upstream of the inlet of the component; and a second filter panel extending from the second face into the coolant airflow path upstream of the first filter panel;

wherein the first and second filter panels are integrated into a common panel having an airflow passage between the first and second panels defined in series by an inlet through one hole in the common panel and an outlet through a further hole in the common panel;

wherein the first and second filter panels do not extend across a full width of the coolant feed passage, wherein the holes have a diameter of between 0.1 and 1 mm, and wherein the coolant airflow path between the first filter panel and the second face, between the second airflow panel and the first face, and between the first filter panel and the second filter panel each has a minimum cross sectional area no smaller than a cross-sectional area of the inlet of the component to be cooled.

\* \* \* \* \*